United States Patent Office 2,706,605
Patented Apr. 19, 1955

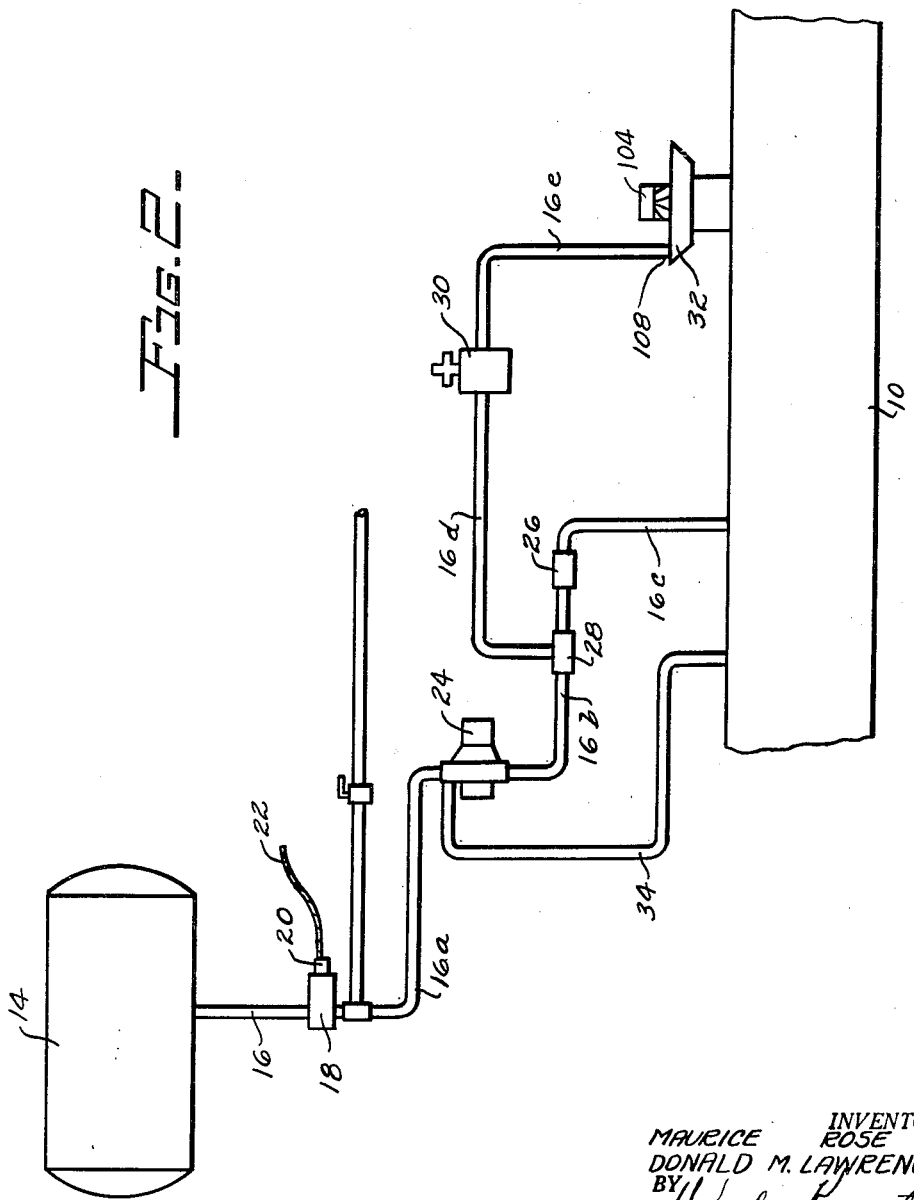

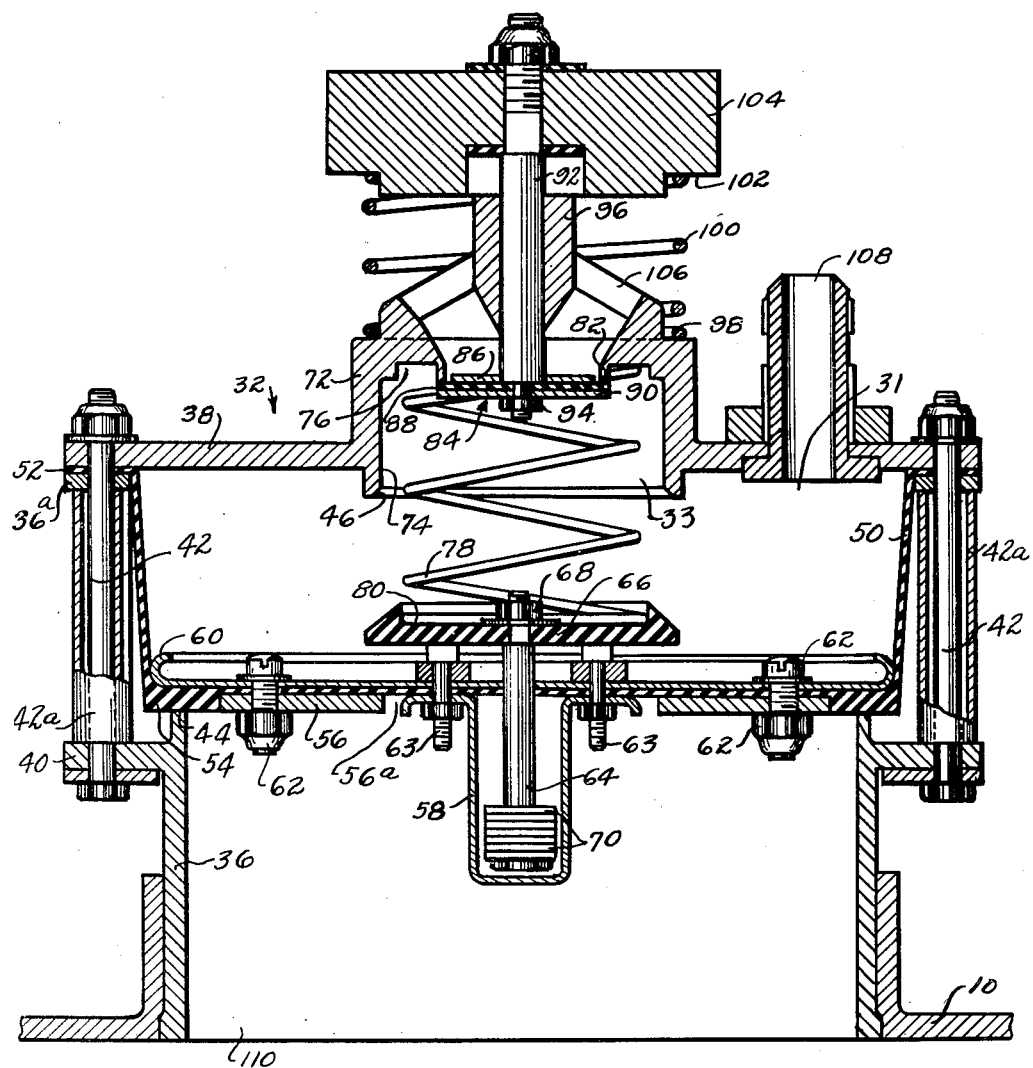

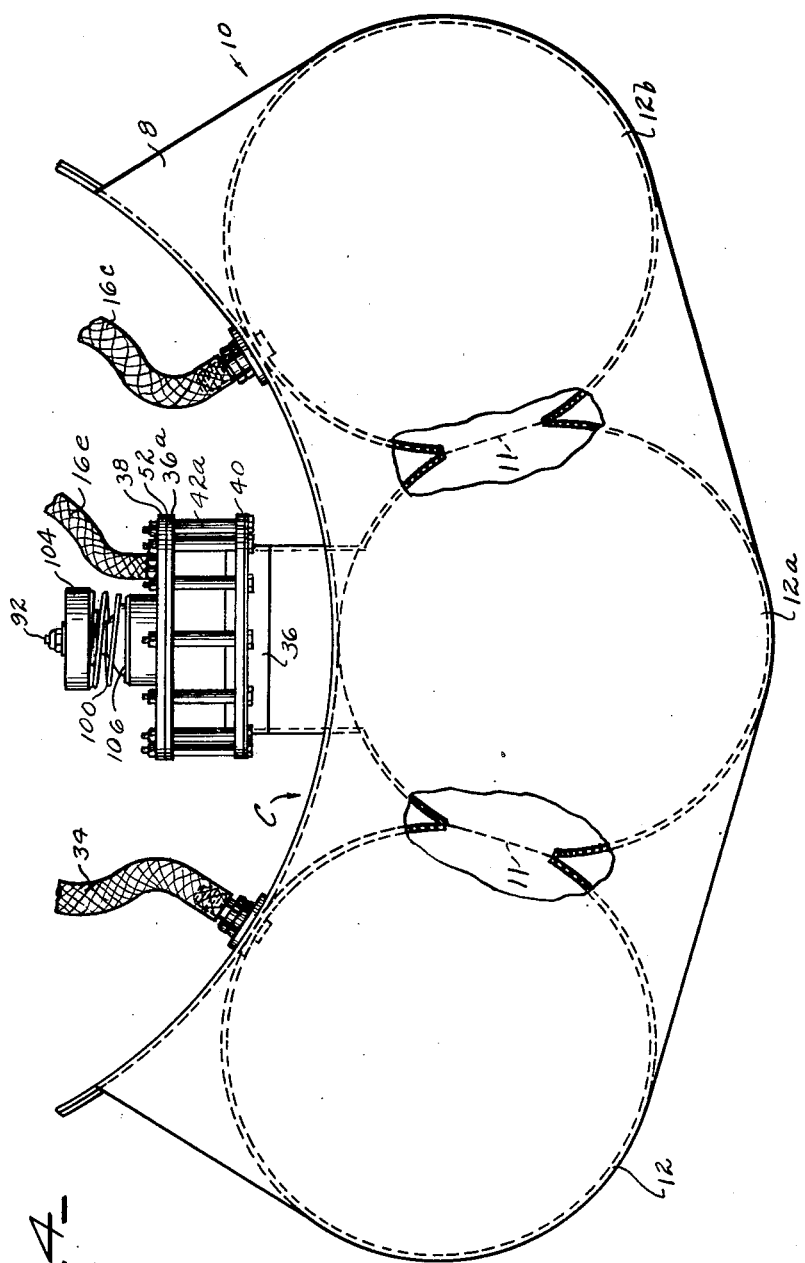

2,706,605

LANDING BUMPER

Maurice Rose, Snyder, N. Y., and Donald M. Lawrence, Wood-Ridge, N. J., assignors to the United States of America as represented by the Secretary of the Air Force Application November 14, 1952, Serial No. 320,366

8 Claims. (Cl. 244—138)

This invention relates to landing devices and more particularly to mechanisms for facilitating the landing of heavy masses released from an aircraft with minimum damage, and while this mechanism was primarily developed for dropping liquid propellant rocket assist take-off units lowered by parachute after they have made their contribution to the take-off of an aircraft to which they are detachably secured, these units may, with equal facility, be employed for arresting downward movement of other objects or containers such as tanks, preferably cylindrical in cross section, and similar objects lowered by parachutes after release from aircraft after they are no longer required or for other reasons are to be jettisioned or discarded.

In order to insure maximum recoverability of a device without ground impact damage when jettisoned, a recovery system is provided which contemplates a parachute retarded descent in conjunction with a pneumatic landing device, intended to minimize the landing shock upon ground contact.

To promote a better understanding of the construction and operation of an embodiment of the invention such as is herein disclosed, reference may be had to the following description taken in conjunction with the accompanying drawings, wherein:

Fig. 1 is a diagrammatic view of a cylindrical object such as a rocket-assist-take-off unit right after it has been released from the airplane which it assisted in take-off, the weight of the object or unit having been transferred to a supporting parachute which it carried. Prior to the release, the parachute is packed in a depression or cylindrical receptacle 5 in the front end of the article or take-off unit. The take-off unit or cylindrical object is equipped with a bumper device adapted to lessen the initial shock of ground contact and forming an important part of the invention.

Fig. 2 is a schematic view of the bumper or landing device including the valves and piping together with a pressurized gas supply tank used for bumper inflating and operation.

Fig. 3 is an axial cross section taken through a special bumper and vent valve construction used in the operation of the bumper mechanism and forming an important component of the invention.

Fig. 4 is an end view of the main bumper element.

Like reference characters refer to like parts throughout the several views.

Figure 1:
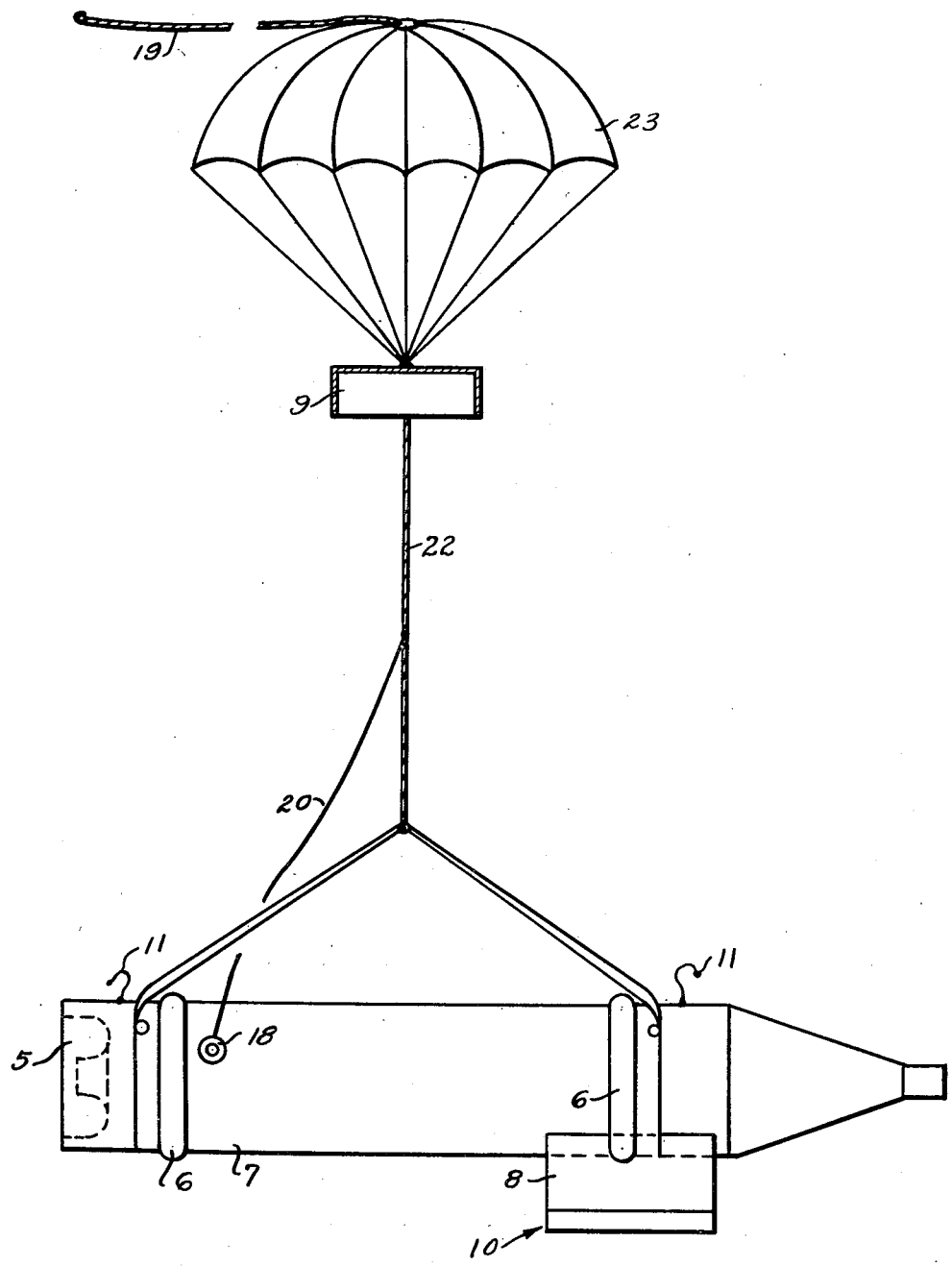

The pneumatic landing device comprises an inflatable collapsible bag 8 fabricated from synthetic rubber impregnated nylon cloth together with a number of pneumatically controlled components designed to alternately pressurize and vent the inflatable bag 8 in a manner which will hereinafter be apparent.

Two auxiliary sponge rubber bumpers 6 encircle the cylindrical member 7 which is to be dropped and landed in order to minimize damage to the unit which may follow should the same tend to roll, which may occur upon initial ground contact especially if a cross wind is present.

The auxiliary bumpers 6 may be fabricated from sponge rubber preferably in inch thick layers confined in a canvas channel or retainer secured to the exterior of the cylindrical member 7 near its opposite ends.

Referring particularly to the schematic view Fig. 4, the bumper 10 comprises three elongated adjacent parallel flexible collapsible fabric cylinders or bags 12, 12a and 12b, the bottom of the middle cylinder 12a preferably projecting downwardly beyond the bottom of the other two. The upper surfaces of the bags of the bumper lie on a radius C which corresponds to the radius of the cylinder or object 7.

A high pressure supply tank 14 (see Fig. 2) is provided for containing a compressible fluid medium or gas under pressure which, in the embodiment shown, is helium with which the bumper is inflated, this gas being partly used by the take-off assist unit prior to the jettisoning thereof. The tank 14 can contain air under high pressure, in the event that the bumper is used to lower a cylindrical object not requiring helium gas. Piping 16, 16a, 16b, 16c and 16d provides flow communication between the pressure tank 14 to the bumper device 10. The several cylinders or bags 12, 12a and 12b are interconnected one to the next as at 11 to provide intercommunication therebetween. (See Fig. 4.)

Interposed in the pipeline between piping 16 and 16a (see Fig. 2) is a bumper-actuating valve 18 initially preventing flow of the compressible fluid (helium) from tank 14, and interposed in the pipeline between piping 16a and 16b is a pressure regulator bumper fill valve 24. This valve 24 is a commercially procurable pressure regulating valve set so that the pressure downstream of the valve is maintained at predetermined value such as 10 p. s. i. The bumper actuating valve 18 is initially closed to helium flow from helium tank 14. A cable release 20 for valve 18 is provided and attached to the parachute suspension cable 22, Fig. 1, when the parachute is packed in the front end of the unit 7 in such a way that opening of the parachute 23 pulls the cable release to the bumper actuating valve 18 when slack is taken up on the suspension cable by the parachute thereby opening the valve 18 to permit helium flow from the tank 14 to the pressure regulator valve 24. Thereafter the gas or compressible fluid medium from tank 14 will flow under the reduced pressure from the bumper fill valve 24, pipe 16b, T 28, check valve 26 and pipe 16c into the bumper 10 pressurizing the bumper bags to the predetermined pressure (10 p. s. i.). Bumper fill valve 24, like valve 18, is a standard article of manufacture procurable on the open market.

Positioned between pipe sections 16b and 16c is a conventional check valve such as a "Parker" check valve 26 opening toward the bumper and the T fitting 28 through which the pressurized fluid under reduced pressure may flow from the bumper fill valve 24 through pipes 16b and 16c to the bumper 10 but may not return through the check valve 26 when bumper fluid pressure is increased by ground contact of bumper. A portion of the pressure fluid is also bypassed from the T fitting 28 through pipe sections 16d and 16e, and through a second pressure regulator valve 30 and into a diaphragm chamber 31 of a bumper vent valve 32 forming an important element of the invention, thereby holding said bumper vent valve closed against a predetermined low pressure within the bumper bags of approximately 10 p. s. i.

A pipe section 34 provides two-way flow communication between the diaphragm side of the pressure regulator bumper fill valve 24 for balancing the normal bumper bag pressure against higher pressure in the tank 14.

The tank 14 is initially charged with helium at about 2000 p. s. i. for initial operation of the assist unit and subsequently pressurizing the several elements of the landing unit. Any other suitable gas or compressible fluid medium may be employed within the scope of the invention.

Simultaneously with the inflation of the bumper 10 gas flows from the bumper fill valve 24 and is routed through a second pressure regulator valve 30 into a diaphragm chamber 31 of the bumper vent valve 32. The second pressure regulator valve 30, also a commercially available air-spring type regulator set at a predetermined pressure such as 10 p. s. i. limits pressure in the diaphragm chamber 31 to 10 p. s. i. The diaphragm 50 of bumper fill valve 32 has a valve portion 54 to close the bumper exhaust aperture or vent opening and is designed with an opposing pressure area ratio of approximately 4:3 so that the resultant unbalance of force between the interior of the bumper and diaphragm chamber 31 normally maintains a diaphragm seal of the bumper exhaust opening against a normal bumper pressure of 10 p. s. i. The bumper vent valve 32 is of special construction and is shown to an enlarged scale in Fig. 3.

Referring to Fig. 3, the housing of the bumper vent valve 32 comprises an annular or tubular body member 36 in free communication with the interior of the bumper, and a top cover member 38 and body 36, the cover member 38 being held in assembled spaced relation by bolts 42 and tubular spacers 42a. An annular valve seat 44 of large diameter extends upwardly from the annular body 36 and a valve seat 46 of smaller diameter extends downwardly from a diaphragm chamber vent passage through the top cover 38.

A large, but thin, hat-shaped diaphragm of rubber impregnated fabric layers has a slightly conical flexible portion 50 flanged outwardly as at 52 at the upper end and thickened as the valve portion 54 at the lower end, the upper diaphragm flange 52 being clamped between a ring 36a and the top cover 38 and the lower annular diaphragm valve portion 54 being adapted to normally seat on the valve seat 44 preventing escape of gas from the bumper 10.

A circular depression in the underside of the diaphragm 50 contains a metal disc 56 having a central opening 56a for receiving the flange of the cup member 58. A pressure plate 60 rests on top of the central portion of the diaphragm 50 and above the thickened valve portion 54, the diaphragm 50, ring plate 56, cup 58 and top plate 60 being held in their assembled relation as shown in Fig. 3 by bolts 62 and 63.

A valve stem 64 has poppet valve 66 secured thereto by a nut 68 and rests on the upper ends of the bolts 63 whereby the valve 66 is raised into contact with the valve seat 46 to close the diaphragm chamber 31 to the diaphragm venting passage and upper chamber 33. A series of washers 70 on the lower end of the stem 64 for valve stem movement limiting contact with the lower face of the diaphragm may be removed one or more at a time to adjust the distance between the valve plate 66 and the top washer.

The cover 38 carries a hub portion 72 which is cupped out at 74 and counterbored as at 76 to receive the upper end of a spring 78, the lower end of which is seated in a depression 80 in the upper surface of valve plate 66. A valve seat 82 surrounds a diaphragm chamber vent passage inside of the hub 72, and an inertia operated plate valve 84 rests on the seat 82. Plate valve 84 is composed of three discs 86, 88 and 90, as shown, the central disc 88 being of synthetic rubber, or the like and adapted to engage seat 82 while the discs 86 and 90 are of metal. The three discs are secured to a valve stem 92 by a nut 94, the valve stem 92 being slidable in the hub spider 96. An annular shoulder 98 on the hub portion 72 provides a seat for the lower end of a valve closure spring 100, a corresponding shoulder 102 on the underside of an inertia actuated weight 104 provides a seat for the upper end of the spring 100. The inside of the hub 72 is vented through the spider portion of the valve guide 96 as at 106. Gas enters the diaphragm chamber 31 at 108 and discharges at 106, providing both valves 90 and 66 are open.

The operation of the bumper mechanism is substantially as follows:

The bumper actuating valve 18 is normally closed to gas or helium flow before the article to be decelerated by the bumper device is released from its elevated support, such as an airplane. When the cylindrical object 7 is dropped by release from the bomb shackles 11 of an airplane to which it was connected, a static line 19 withdraws the parachute 23 from its container 5 and permits opening of the parachute 23. When the parachute opens, the suspension cable 22 is tensioned, pulling the cable release 20 to the bumper actuating valve 18, thereby opening the valve and permitting gas flow from tank 14 through pipe 16a.

Gas now flows from the pressure tank 14 through pipe 16, bumper actuating valve 18, pipe 16a, bumper fill pressure regulator valve 24, pipe 16b, T 28, check valve 26, and pipe 16c into the bags of the bumper 10 (see Fig. 2) and coincidentally the pressure fluid is also routed or bypassed through T 28, pipe 16d, vent diaphragm pressure regulator valve 30, pipe 16e into the diaphragm chamber 31 of the bumper vent valve 32 (see Fig. 3). Gas from the bumper 10 is also returned through the pipe 34 and into the bumper fill valve 24 at the pressure regulator diaphragm side thereof to regulate the pressure in line 16b and the bumper is inflated to a predetermined pressure of, say 10 p. s. i.

Upon ground contact of the descending bumper 10, the inertia of the actuating weight 104 of the bumper diaphragm chamber vent valve 82 overcomes the retaining force of the preloaded spring 100, and the downward movement of the plate valve 82 opens the vent passage 106 to the upper chamber 33 above the diaphragm chamber 31. Release of gas from the upper chamber 33 and diaphragm chamber 31 creates an immediate unbalance of pressure on the lower side of the valve diaphragm 50 causing the same to move upwardly permitting escape of gas from the bumper 10. Contact of the bottom of the bumper 10 with the ground compresses the bumper bags and increases the gas pressure therein considerably above the predetermined (10 p. s. i.) pressure. The poppet valve 66 is moved upwardly by the diaphragm 50 and closes the upper chamber 33 to the relief vent 106 which closes the diaphragm chamber 31 by the seating of the valve 66 on the seat 46. This causes pressure in the diaphragm chamber 31 being introduced through pipe 16e and nipple 108 to build up rapidly, thus pushing the diaphragm 50 down and reduce and regulate the escape of gas from the bumper at a rate providing constant deceleration of the load carried on the bumper device as it comes to rest on the ground. The kinetic energy of the dropping load is converted into potential energy by compressing the gas in the bumper as the bumper device contacts the supporting surface or ground. This energy is dissipated by venting the compressed gas within the bags of the bumper to atmosphere.

If the upper diaphragm chamber 33 and vent passage 106 remained closed and to prevent further escape of bumper gas before deceleration was completed the bag pressure would increase and the excess pressure would result in bouncing of the unit (or a bursting of the bags). However, before the bumper vent diaphragm valve 50—54 can return completely to its closed position again the bottom of the plate 60 engages the top washer 70 on the stem 64 of the upper-chamber-vent-plug or poppet 66 and pulls the plug valve 66 down off its seat 46. The inertia of the weight 104 is still effective to keep plate valve 82 open until deceleration is substantially complete and the opening of the poppet valve 66 again vents the excess pressure from the back of the diaphragm 50, allowing the bag pressure to again raise the diaphragm 50 and thus reduce the bumper bag pressure again by increasing the rate of gas escape from the bumper bags past valve seat 44. When the inertia of the weight 104 has been overcome as downward acceleration of the bumper device approaches zero, the valve 82 then closes by spring 100 so that pressure entering the diaphragm chamber 31 from pipe 16e can build up and balance the pressure in the bumper or collapsible container entering through pipe 34.

Since the bumper pressure cannot become excessive while the inertia operated valve 82 is opened the bumper pressure cannot build up sufficiently to cause the bumper and its load to bounce.

We claim:

1. Apparatus for decelerating the fall of an object to a rate slower than its fall by gravity which includes a parachute, a cable connected to said parachute to open said parachute, a parachute suspension cable depending from said parachute, means on the lower end of said cable for suspending said object therefrom, an inflatable and collapsible bumper fixed on the underside of said object for contact with a supporting surface in its path prior to the object to controllably collapse said bumper, a pressure source including pipe means therefrom to the bumper for inflating the bumper, a valve in said pipe means operable to inflate said bumper, and means operative by opening of said parachute to open said valve and combined pressure and inertia operated valve means in said bumper for controllably venting said bumper to relieve pressure increase therein during deceleration thereof upon impact of the bumper with a supporting surface in its path and compression of the bumper between the supporting surface and the object supported by the bumper.

2. Apparatus for decelerating the fall of an object jettisoned from an airplane which comprises a parachute carried on and connected to said object, a release cable extending from said airplane to said parachute for opening said parachute, an inflatable collapsible shock absorbing and decelerating bumper carried at the lower side of said object for impact with a supporting surface in its downward path, a source of gas under pressure carried on said object, valve means operative by pull between the parachute and object to admit gas from said source to the bumper at a predetermined pressure to inflate said bumper and pressure operated venting valve means in said bumper for automatically relieving excess pressure in said bumper in excess of a predetermined pressure therein higher than the aforesaid admitted predetermined pressure.

3. In a deceleration device for a falling object, a closed flexible inflatable and collapsible decelerating and shock absorbing container adapted to be secured at the bottom of the said object to receive the impact of the falling object upon contact with a supporting surface in its path, a compressible pressure fluid source, a pressure regulator connected between the fluid pressure source and the container for admitting pressure from the said fluid pressure source to the container at a predetermined rate and relative low pressure, and an inertia operated vent valve means carried on the container and connected to the container and operable by deceleration thereof to vent the pressure within the container incident to contact of the container with the supporting surface.

4. In a deceleration device for a parachute retarded falling object, a closed collapsible pressure container bumper device adapted to be secured to the falling object below the bottom thereof for impact with the ground below the falling object, a combined inertia and pressure operated vent valve means for venting the container to control the pressure build-up therein upon impact thereof with the ground, a compressible pressure medium source, a first pressure regulator means connecting the pressure source with the interior of the container to pressurize the same to a predetermined relative low pressure, said vent valve means for said container having a vent opening in communication with the interior of the container, a closed diaphragm chamber disposed above the vent opening in spaced relation thereto including a diaphragm therein, vent valve closure means carried by the diaphragm and movable thereby to and from closing engagement with the vent opening, a second pressure regulator including conduit means between the said first pressure regulator means and said diaphragm chamber for establishing a predetermined pressure in said diaphragm chamber, a diaphragm chamber vent passage formed in said vent valve, means leading from the diaphragm chamber, an inertia operated valve for normally closing the diaphragm chamber vent passage and operable to open the diaphragm chamber vent passage upon impact and deceleration of the device upon contact thereof with the ground during its fall, spring means urging the inertia operated valve to closed position to close the diaphragm chamber vent passage, a second vent valve for the diaphragm chamber shiftably carried by the diaphragm and movable thereby to close the diaphragm chamber vent passage independently of the inertia operated vent valve incident to movement to the diaphragm toward the diaphragm chamber vent passage, spring means between the diaphragm chamber and the said second valve biasing the same away from the last mentioned vent passage and toward supporting relation on the diaphragm, said second valve having a valve stem extending therefrom through the diaphragm to slidably support said second valve for diaphragm chamber vent closing movement toward the diaphragm chamber vent opening incident to movement of the diaphragm toward the diaphragm chamber, and actuating means carried by the said valve stem for actuating engagement by the diaphragm incident to movement of the diaphragm toward the container vent opening to unseat the second valve to vent the diaphragm chamber through the diaphragm chamber vent passage while the inertia vent valve is open.

5. In a deceleration landing bumper device for falling objects lowered by parachutes, a flexible collapsible inflatable container, pressure regulated pressure supply means for inflating the container to a predetermined inflation pressure upon suspension of an object carried on the container by a connected parachute, an inertia controlled vent valve carried by the bumper in communication with the interior of the container for venting the container to relieve the increase of pressure therein upon contact of the bottom of the container with a supporting surface in its downward path to decelerate the object supported by the container and prevent bouncing thereof said vent valve comprising a casing having a container vent opening in communication with the interior of the container terminating in an annular container vent valve seat, a diaphragm chamber disposed above the vent container valve seat having a diaphragm valve therein movable vertically at the lower side of the diaphragm chamber for closing the vent valve opening, whereby excessive pressure within the container is operative to unseat the diaphragm to vent the container, a pressure supply pipe connected to the interior of the diaphragm chamber and the regulated pressure supply means for supplying a predetermined opposing pressure to the diaphragm chamber to depress the diaphragm to close the container vent opening, a diaphragm chamber vent passage opening upwardly centrally from the diaphragm chamber and having a surrounding valve seat at its lower end, a second valve carried by the diaphragm and movable upwardly with the diaphragm to seat on the diaphragm chamber vent passage seat to close the diaphragm chamber to its vent passage incident to maximum upward movement of the diaphragm from the container vent opening, said second vent valve having a valve stem therefrom freely slidable through a guide opening formed in the diaphragm, actuating means carried by the valve stem for engagement with the lower side of the diaphragm when the second valve is seated to close the diaphragm chamber vent opening to unseat said second valve incident to predetermined downward movement of the diaphragm toward said container vent opening, spring means for yieldably urging said second valve and diaphragm downwardly to container vent closing position, an inertia operated valve vertically movable downwardly in the diaphragm chamber vent passage to open the same, a cooperating valve seat in said diaphragm chamber vent passage above the valve seat for the second valve, said inertia operated valve having a valve actuating stem extending upwardly therefrom above the diaphragm chamber vent passage, valve guide means centered in said diaphragm chamber vent passage for slidably receiving said valve stem, an inertia operated weight member fixed to the upper end of the inertia valve stem in normally vertically spaced relation to said valve guide means, and spring means yieldably urging said inertia valve stem upwardly to close the diaphragm chamber vent passage independently of the second valve, whereby when the descending container first strikes the ground and is partly collapsed by the impact, the inertia of the said weight immediately opens the inertia valve to vent the diaphragm chamber and the increase in pressure within the container due to the partially compressed container at the opposite side of the diaphragm immediately opens the container vent valve and lifts the second valve to close the diaphragm chamber venting passage causing said predetermined pressure entering the diaphragm chamber to force the diaphragm again downwardly to move the container vent valve toward closed position and said closing movement of the diaphragm unseats the second valve to again reduce pressure within the diaphragm chamber while the inertia operated valve in still open causing the container vent to again open and vent the container before excessive pressure can build up within the container preventing the container from bouncing during the time that the inertia operated valve is held open by said inertia weight.

6. A pneumatic deceleration device for decelerating falling objects and absorbing the inertia thereof upon impact thereof with a supporting surface in its path prior to contact of the falling object with the surface comprising a flexible inflatable and collapsible bumper bag forming a closed chamber, means for securing the bag to the bottom of an object to be dropped intermediate the bottom of the object and the aforesaid supporting surface, pressure fluid supply means including a pressure regulator connected for supplying a compressible pressure fluid to said chamber at a predetermined low pressure to inflate the bag to a predetermined pressure, pressure operated venting valve means connected to said chamber for venting the bag to relieve the pressure therein upon a predetermined pressure increase therein beyond the aforesaid predetermined pressure, including inertia operated control valve means for said pressure operated venting valve means operable by predetermined deceleration thereof upon impact with the supporting surface for opening said pressure operated venting valve means to vent said chamber during said deceleration to reduce excess pressure in said chamber during said deceleration caused by compression of the bag between the falling object and the supporting surface upon impact thereof with said surface.

7. A device for decelerating a falling object lowered by a parachute to absorb the inertia thereof prior to contact with a supporting surface in its downward path comprising a flexible, inflatable and collapsible pressure container forming a landing bumper member, means for fixing the said bumper member to the bottom of the object to be lowered intermediate the object and a supporting surface in its path for impact with the supporting surface to cushion and decelerate the fall of the object prior to its contact with the supporting surface, a relatively high pressure compressible fluid medium source connected to said container for the inflation and pressurizing thereof including a pressure regulator for controlling the inflation of said container to a predetermined low pressure, a pressure regulating vent valve means connected to the top portion of said container for venting the container upon a predetermined increase in pressure therein in excess of said predetermined low pressure, an inertia operated device carried by said venting valve means at the upper portion of said collapsible container operatively associated with said venting valve means for opening the venting valve means to increase the venting of the container upon impact of the lower portion of the container with a supporting surface in its path, and the effective inertia thereon of the upper portion of the container and a supported object when fixed thereon to reduce the excess pressure in the container incident to compression thereof between an object supported thereon and a supporting surface being contacted in its path.

8. Venting device for a deceleration shock absorbing bumper having an inflatable collapsible impact absorbing pressure chamber, an intertia controlled valve, a housing carried by the upper part of said chamber comprising a lower member having a large central vent opening in communication with the interior of the collapsible chamber, an upper member, plural spacing means disposed in spaced relation to each other between said members for holding said members in vertically spaced relation, a cylindrical diaphragm valve flanged inwardly at the lower end and outwardly at the upper end, the upper end of the diaphragm being sealed to the upper member to form a diaphragm chamber and the lower end froming a vent valve closing said large central vent opening, said diaphragm having a cylindrical flexible wall portion larger than said central vent opening and having an annnular valve portion movable at its lower end to close the said vent opening, a pressure plate disposed across said inwardly flanged portion closely fitting to the inside of the cylindrical portion of the diaphragm, a valve stem slidable vertically in a central guide opening formed in said pressure plate, a poppet valve fixed to the top of said valve stem, a spring urging said poppet valve downwardly toward said pressure plate, stop means between said stem and said pressure plate to limit the vertical upward movement of said valve stem relative to the pressure plate, a valve seat for said poppet valve formed in the upper member for sealing engagement with said valve plug, an inertia operated valve stem mounted in said upper member coaxial with and movable above the first mentioned valve stem, an inertia operated weight fixed on the upper end of said inertia valve stem, a spring yieldably urging said inertia weight upwardly to its upper position, an inertia operated second valve fixed on the lower end of the inertia valve stem, a third valve seat formed in the upper member for sealing engagement with said second valve, said upper member having a space formed therein above said third valve seat and vented to the atmosphere concentrically above said second valve being normally open to provide communication with said space below the said inertia venting valve and the interior of the diaphragm between, an inlet opening formed in said upper member in communication with said diaphragm chamber to admit pressurized gas under predetermined pressure to the diaphragm chamber between the upper and the lower members.

References Cited in the file of this patent

UNITED STATES PATENTS

| 1,572,889 | Degen | Feb. 16, 1926 |
| 1,836,495 | Paulson | Dec. 15, 1931 |
| 2,457,205 | Campbell | Dec. 28, 1948 |

FOREIGN PATENTS

| 347,579 | Germany | Jan. 23, 1922 |